US012764647B2

(12) United States Patent
Yu

(10) Patent No.: US 12,764,647 B2
(45) Date of Patent: Oct. 13, 2026

(54) COMMUNICATION METHOD

(71) Applicant: BEIJING XIAOMI MOBILE SOFTWARE CO., LTD., Beijing (CN)

(72) Inventor: Lei Yu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 392 days.

(21) Appl. No.: 18/289,874

(22) PCT Filed: May 10, 2021

(86) PCT No.: PCT/CN2021/092919
§ 371 (c)(1),
(2) Date: Nov. 7, 2023

(87) PCT Pub. No.: WO2022/236646
PCT Pub. Date: Nov. 17, 2022

(65) Prior Publication Data
US 2024/0244513 A1 Jul. 18, 2024

(51) Int. Cl.
*H04W 48/18* (2009.01)
*H04M 15/00* (2006.01)
*H04W 28/02* (2009.01)
*H04W 28/24* (2009.01)

(52) U.S. Cl.
CPC .......... *H04W 48/18* (2013.01); *H04M 15/66* (2013.01); *H04W 28/0268* (2013.01); *H04W 28/24* (2013.01)

(58) Field of Classification Search
CPC . H04W 48/18; H04W 28/0268; H04W 28/24; H04W 4/24; H04W 8/14; H04W 72/54; H04M 15/66; H04M 15/8016; H04L 41/082; H04L 41/5022; H04L 12/1407; H04L 41/0894; H04L 41/0896; H04L 41/40; H04L 47/20
USPC .......................................... 370/310, 328, 329
See application file for complete search history.

(56) References Cited

U.S. PATENT DOCUMENTS

2015/0049610 A1* 2/2015 Kim .................. H04W 28/0215 370/233
2021/0368395 A1* 11/2021 Prabhakar ............. H04W 28/22
2022/0353729 A1* 11/2022 Liang .................... H04W 28/02
2022/0360977 A1* 11/2022 Kim ......................... H04W 8/08
2023/0362031 A1* 11/2023 Vaishnavi ............ H04W 24/08

OTHER PUBLICATIONS

PCT/CN2021/092919, International Search Report dated Dec. 23, 2021, 2 pages.

(Continued)

*Primary Examiner* — Obaidul Huq
(74) *Attorney, Agent, or Firm* — Cozen O'Connor

(57) ABSTRACT

A communication method includes: in response to being triggered by a policy decision, performing, by a first control plane network element, an SM policy association modification procedure initiated by the first control plane network element, to notify a second control plane network element of a modification of a policy; and in responding to determining that a data rate for S-NSSAI reaches a threshold, using, by the first control plane network element, a utilized data rate for the policy decision, and downgrading, by the first control plane network element, an Session-AMBR.

20 Claims, 7 Drawing Sheets

(56) References Cited

OTHER PUBLICATIONS

Ericsson "KI#3—Slice Maximum Bit Rate (Slice-MBR)" 3GPP TSG-WG SA2 Meeting #144E e-meeting, S2-2102135, Apr. 2021, 5 pages.

Ericsson et al. "KI#3—Slice Maximum Bit Rate (Slice-MBR)" 3GPP TSG-WG SA2 Meeting #144E e-meeting, S2-2103473, Apr. 2021, 5 pages.

European Patent Application No. 21941222.8, Search and Opinion dated Feb. 21, 2024, 19 pages.

3rd Generation Partnership Project; Technical Specification Group Services and System Aspects; Study on enhancement of network slicing; Phase 2 (Release 17); 3GPP TR 23.700-40; Mar. 2021; 224 pages.

* cited by examiner

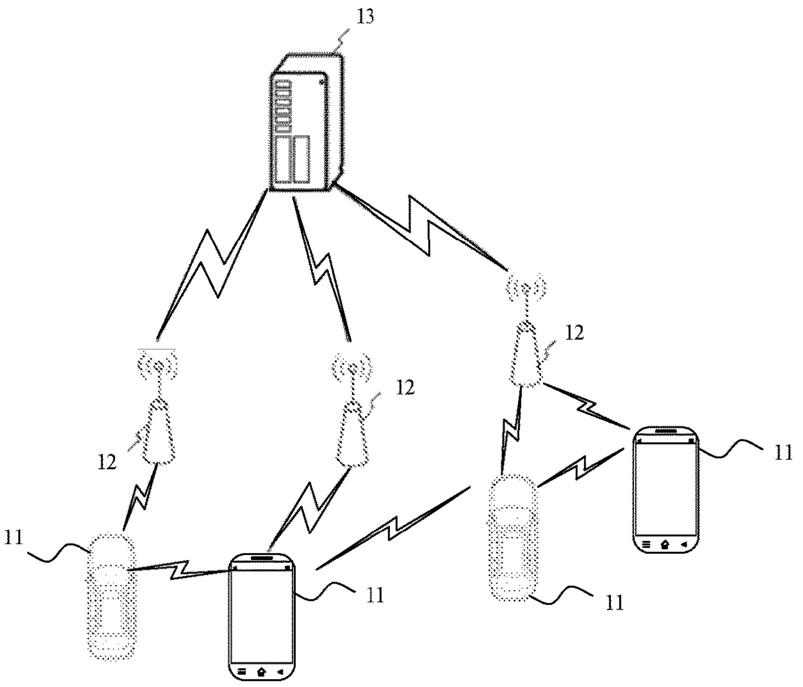

FIG. 1

201 in response to being triggered by a policy decision, performing, by a first control plane network element, an SM policy association modification procedure initiated by the first control plane network element, to notify a second control plane network element of a modification of a policy 202 if a data rate of a slice reaches a threshold, using, by the first control plane network element, a utilized data rate as an input to the policy decision, and downgrading, by the first control plane network element, an Session-AMBR

FIG. 2

301 receiving, by a second control plane network element, a first indication message from a first control plane network element, the first indication message indicating that a data rate for S-NSSAI reaches a threshold 302 changing, by the second control plane network element, an Session-AMBR in response to the first indication message

FIG. 3

COMMUNICATION METHOD

CROSS-REFERENCE TO RELATED APPLICATIONS

The present application is a National Stage of International Application No. PCT/CN2021/092919, filed on May 10, 2021, the contents of which are incorporated herein by reference for all purposes.

FIELD

The present disclosure relates to a communication method, apparatus and system, a network device and a storage medium.

BACKGROUND

A network slice can provide functionalities of a complete network, including radio access network functions, core network functions and IP multimedia subsystem (IMS) functions. One network can support one or several network slices. Network slices can provide different promised services and are dedicated to a user. Slices of the same service or slice type but with different slice differentiators may have different single network slice selection assistance information (S-NSSAI).

The operator can deploy multiple network slices delivering exactly the same features but for different groups of UEs, for example, as they deliver a different committed service and/or because they are dedicated to the user, in which case such network slices may have different S-NSSAIs with the same slice/service type but different slice differentiators.

Selection of a set of network slice instances for a UE is triggered by a first contacted access and the mobility management function (AMF) in a registration procedure normally by interacting with the network slice selection function (NSSF), and may lead to a change of the AMF. A packet data unit (PDU) session belongs to one and only one specific network slice instance per public land mobile network (PLMN). Different network slice instances do not share a PDU session, but different network slice instances may have slice-specific PDU sessions using the same deep neural network (DNN). During the Handover procedure the source AMF selects a target AMF by interacting with the NF repository function (NRF).

The network slice type (NEST) applies to a network slice even when supported by multiple network slice instances. Generic network slice template (GST) defines attributes supported by the network slice. For example, the maximum downlink throughput defines the maximum data rate supported by the network slice in downlink, and the maximum uplink throughput defines the maximum data rate supported by the network slice in uplink. These parameters can be used to offer different network slice contract quality levels, for gold, silver and bronze subscribers, which have different maximum throughput values applied to both guaranteed bit rate (GBR) and non-GBR traffic.

While it is possible for the PLMN to support per slice data rate limit by configuration, in order to meet the network control requirements, the network may need to make adjustment to network to control aggregate traffic in the UL and DL across the slice, for example, trigger fairness across UE data rates in the PLMN when this limit of the data rate is reached. On this basis, how to adjust per UE data rate limits which apply to both the GBR and non-GBR traffic, and how to adjust total number of UEs operating in the slice are key issues. Finding a way to achieve dynamic adjustment to meet the limitation of the data rate per network slice in the UL and DL is a problem in the network slice function of 5G.

SUMMARY

Accordingly, the embodiments of the present disclosure provide a communication method, apparatus and system, a network device and a storage medium.

According to a first aspect of embodiments of the present disclosure, there is provided a communication method including: in response to being triggered by a policy decision, performing, by a first control plane network element, a session management (SM) policy association modification procedure initiated by the first control plane network element, to notify a second control plane network element of a modification of a policy; and if a data rate for single network slice selection assistance information (S-NSSAI) reaches a threshold, using, by the first control plane network element, a utilized data rate for the policy decision, and downgrading, by the first control plane network element, a session aggregate maximum bit rate (Session-AMBR).

According to a second aspect of embodiments of the present disclosure, there is provided a communication method including: in response to being triggered by a policy decision, performing, by a first control plane network element, a session management (SM) policy association modification procedure initiated by the first control plane network element, to notify a second control plane network element of a modification of a policy; and if a data rate for single network slice selection assistance information (S-NSSAI) reaches a threshold, updating, by the first control plane network element, a policy and charging control (PCC) rule, and using, by the first control plane network element, a utilized data rate for the policy decision of the first control plane network element.

According to a third aspect of embodiments of the present disclosure, there is provided a communication method including: receiving, by a second control plane network element, a first indication message from a first control plane network element, the first indication message indicating that a data rate for single network slice selection assistance information (S-NSSAI) reaches a threshold; and changing a session aggregate maximum bit rate (Session-AMBR) in response to the first indication message.

According to a fourth aspect of embodiments of the present disclosure, there is provided a communication method including: receiving, by a second control plane network element, a first indication message from a first control plane network element, the first indication message indicating that a data rate for single network slice selection assistance information (S-NSSAI) reaches a threshold; and changing a maximum bit rate (MBR) and a guaranteed bit rate (GBR) corresponding to a service data flow (SDF) in response to the first indication message.

According to a fifth aspect of embodiments of the present disclosure, there is provided a communication method including: in response to being triggered by a policy decision, performing, by a first control plane network element, an access and mobility management (AM) policy association modification procedure initiated by the first control plane network element, to notify a third control plane network element of a modification of a policy; and if a data rate for single network slice selection assistance information (S-NSSAI) reaches a threshold, downgrading, by the first control plane network element, a user equipment-slice-aggregate maximum bit rate (UE-Slice-AMBR), and using, by the first control plane network element, a utilized data rate for the policy decision of the first control plane network element.

According to a sixth aspect of embodiments of the present disclosure, there is provided a communication method including: receiving, by a third control plane network element, a second indication message from a first control plane network element, the second indication message indicating that a data rate for single network slice selection assistance information (S-NSSAI) reaches a threshold; and changing a user equipment-slice-aggregate maximum bit rate (UE-Slice-AMBR) in response to the second indication message.

According to a seventh aspect of embodiments of the present disclosure, there is provided a first network device, including a processor, a transceiver, a memory, and a processor-executable program stored in the memory that, when executed by the processor, causes steps of the communication method to be implemented.

According to an eighth aspect of embodiments of the present disclosure, there is provided a second network device, including a processor, a transceiver, a memory, and a processor-executable program stored in the memory that, when executed by the processor, causes steps of the communication method to be implemented.

According to a ninth aspect of embodiments of the present disclosure, there is provided a third network device, including a processor, a transceiver, a memory, and a processor-executable program stored in the memory that, when executed by the processor, causes steps of the communication method to be implemented.

According to a tenth aspect of embodiments of the present disclosure, there is provided a communication system, at least including a first control plane network element and a second control plane network element. The first control plane network element is configured as a policy control function (PCF) configured to initiate a session management (SM) policy association modification procedure, to notify the second control plane network element of a modification of a policy with an authorized session aggregate maximum bit rate (Session-AMBR) when a data rate for single network slice selection assistance information (S-NSSAI) reaches a threshold. The second control plane network element is configured to acknowledge a request from the first control plane network element and initiate a packet data unit (PDU) session modification procedure to change the Session-AMBR.

According to an eleventh aspect of embodiments of the present disclosure, there is provided a communication system, at least including a first control plane network element and a second control plane network element. The first control plane network element is configured as a policy control function (PCF) configured to initiate a session management (SM) policy association modification procedure, to notify the second control plane network element of a modification of a policy with a maximum bit rate (MBR) and a guaranteed bit rate (GBR) corresponding to a service data flow (SDF) when a data rate for single network slice selection assistance information (S-NSSAI) reaches a threshold. The second control plane network element is configured to acknowledge a request from the first control plane network element and enforce an authorized quality of service (QoS) of the service data flow according to a policy and charging control (PCC) rule.

According to a twelfth aspect of embodiments of the present disclosure, there is provided a non-transitory computer-readable storage medium having stored therein an executable program that, when executed by a processor, causes steps of the communication method to be implemented.

BRIEF DESCRIPTION OF THE DRAWINGS

The accompanying drawings, which are incorporated in and constitute a part of this specification, illustrate embodiments in line with the present disclosure and, together with the description, serve to explain the principle of the present disclosure.

FIG. 1 is a schematic diagram illustrating a wireless communication system according to an embodiment;

FIG. 2 is a flowchart of a communication method according to an embodiment;

FIG. 3 is a flowchart of a communication method according to an embodiment;

DETAILED DESCRIPTION

Figure 4:
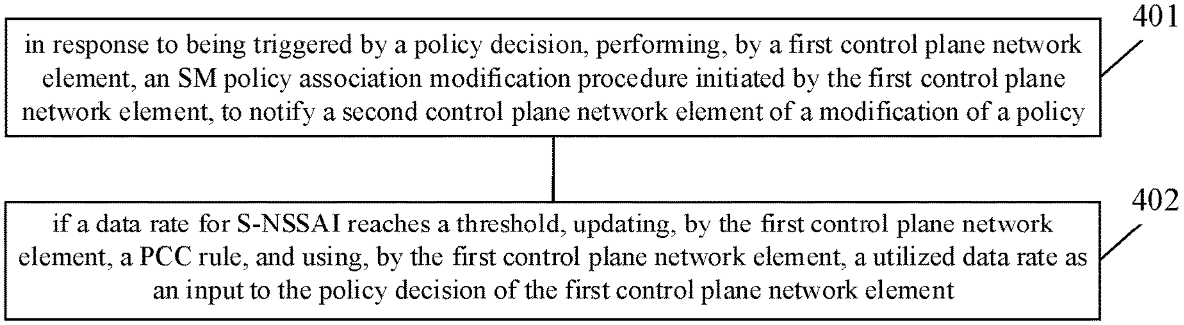
FIG. 4 is a flowchart of a communication method according to an embodiment.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with aspects related to the present disclosure as recited in the appended claims.

Terms used in embodiments of the present disclosure are only for the purpose of describing specific embodiments, and should not be construed to limit the present disclosure. As used in the embodiments of the present disclosure and the appended claims, "a/an", "said" and "the" in a singular form are intended to include plural forms, unless clearly indicated in the context otherwise. It should also be understood that, the term "and/or" used herein represents and contains any one of associated listed items or all possible combinations of more than one associated listed items.

It should be understood that terms such as "first," "second" and "third" may be used in the embodiments of the present disclosure for describing various information, these information should not be limited by these terms. These terms are only used for distinguishing information of the same type from each other. For example, first information may also be referred to as second information, and similarly, the second information may also be referred to as the first information, without departing from the scope of embodiments of the present disclosure. As used herein, the term "if" may be construed to mean "when" or "upon" or "in response to determining" depending on the context.

FIG. 1 shows a schematic structural diagram of a wireless communication system provided by an embodiment of the present disclosure. As shown in FIG. 1, the wireless communication system is a communication system based on the cellular mobile communication technology, and the wireless communication system may include: several terminals 11 and several base stations 12.

The terminal 11 may be a device that provides voice and/or data connectivity to the user. The terminal 11 can communicate with one or more core networks via a radio access network (RAN), and the terminal 11 can be an Internet of Things (IoT) terminal, such as a sensor device and a mobile phone (or called a "cellular" phone), or a computer having the IoT terminal. For example, the terminal 11 may be a fixed device, a portable device, a pocket device, a hand-held device, a computer built-in device or a vehicle-mounted device. For example, it may be a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 11 may be a device of an unmanned aerial vehicle. Alternatively, the terminal 11 may be a vehicle-mounted device, for example, a trip computer with a wireless communication function, or a wireless communication device connected externally to the trip computer. Alternatively, the terminal 11 may be a roadside device, for example, it may be a street lamp, a signal lamp, or other roadside devices with a wireless communication function.

The base station 12 may be a network device in the wireless communication system. The wireless communication system may be a 4th generation (4G) mobile communication system, also known as a long term evolution (LTE) system, or a 5G system, also called a new radio (NR) system or 5G NR system. Alternatively, the wireless communication system may be any generation system. Among them, the access network in the 5G system may be called a new generation radio access network (NG-RAN), or a machine type communication (MTC) system.

The base station 12 may be an evolved base station (eNB) used in the 4G system. Alternatively, the base station 12 may be a base station (gNB) that adopts a centralized distributed architecture in the 5G system. When the base station 12 adopts the centralized distributed architecture, it usually includes a central unit (CU) and at least two distributed units (DUs). The central unit is provided with a protocol stack of a packet data convergence protocol (PDCP) layer, a radio link control (RLC) layer, and a media access control (MAC) layer. The distributed unit is provided with a physical (PHY) layer protocol stack. The specific implementation of the base station 12 is not limited in the embodiments of the present disclosure.

A wireless connection can be established between the base station 12 and the terminal 11 through a wireless radio interface. In different embodiments, the wireless radio interface is a wireless radio interface based on the fourth generation (4G) mobile communication network technology standard; or the wireless radio interface is a wireless radio interface based on the fifth generation (5G) mobile communication network technology standard, such as a new radio interface; or the wireless radio interface is a wireless radio interface based on a next-generation (from 5G) mobile communication network technology standard.

In some embodiments, an end-to-end (E2E) connection is established between the terminals 11, for example, vehicle to everything (V2X) communication, such as vehicle to vehicle (V2V) communication, vehicle to infrastructure (V2I) communication and vehicle to pedestrian (V2P) communication.

In some embodiments, the above wireless communication system may further include a network management device 13.

Several base stations 12 are respectively connected to the network management device 13. The network management device 13 may be a core network device in the wireless communication system, for example, the network management device 13 may be a mobility management entity (MME) in an evolved packet core (EPC) network. Alternatively, the network management device may be other core network devices, such as a serving gateway (SGW), a public data network gateway (PGW), a policy and charging rule function (PCRF) unit or a home subscriber server (HSS), etc. The implementation form of the network management device 13 is not limited in the embodiments of the present disclosure.

Executors involved in the embodiments of the present disclosure include, but are not limited to, a terminal (i.e. a UE) in a cellular mobile communication system, a base station of the cellular mobile communication.

Policy control function (PCF) requests the AMF to report the slice maximum bit rate (MBR) assigned to a subscription permanent identifier (SUPI) per S-NSSAI that has an access and mobility policy association established by activation of a policy control request trigger. When the PCF receives and determines the slice MBR for the SUPI per S-NSSAI, the PCF deducts a value of the slice MBR from a remaining data rate and stores it.

If the remaining data rate for that S-NSSAI reaches a threshold, the PCF may terminate the access and mobility policy association to the AMF or change a slice MBR value for bronze subscribers. The problem in the existing solutions is that the PCF terminates the association or changes the slice MBR according to the assigned data rate, not a utilized data rate.

On the one hand, the utilized data rate of some UEs almost reaches the assigned data rate, but it is possible for other UEs that an amount of unemployed data rate is very large. On the other hand, the utilized data rate of bronze subscribers maybe almost reaches the assigned one, but maybe an amount of unemployed data rate is very large for gold subscribers.

In short, although the actual data rate resource is sufficient, the access and mobility policy association will be terminated, or the data rate of the subscribers with the low priority will be cut down. Such a data rate resource allocation of the slice is extremely unreasonable.

The following describes the technical solutions of the embodiments of the present disclosure in detail, so as to solve the above-mentioned problem of unreasonable allocation of data rate resources.

FIG. 2 is a flowchart of a communication method according to an embodiment. As shown in FIG. 2, the communication method according to the embodiments of the present disclosure is applied to a network device, and the network device includes a control plane network element of a core network element, the communication method of the embodiments of the present disclosure includes the following processing steps.

In block 201, in response to being triggered by a policy decision, a first control plane network element performs a session management (SM) policy association modification procedure initiated by itself, to notify a second control plane network element of a modification of a policy.

In the embodiments of the present disclosure, as an implementation, the first control plane network element includes a PCF network element. The second control plane network element includes a session management function (SMF) network element.

As an example, the PCF performs the SM policy association modification procedure to downgrade a session aggregate maximum bit rate (Session-AMBR), and uses a utilized data rate as an input. The PCF initiates SM policy association modification procedure based on an internal PCF event or triggered by other peers of the PCF, such as application function (AF) network element, a unified data repository (UDR) network element, and a network data analysis function (NWDAF) network element.

In block 202: if a data rate for single network slice selection assistance information (S-NSSAI) reaches a threshold, the first control plane network element uses a utilized data rate as an input to the policy decision, and downgrades the Session-AMBR.

In the embodiments of the present disclosure, as an option, the first control plane network element uses a ratio of the utilized data rate to an accumulated data rate and an MBR per service data flow (SDF) as the input to the policy decision of the first control plane network element.

In the embodiments of the present disclosure, as an option, the first control plane network element uses a subscriber category as the input to the policy decision of the first control plane network element.

As an option, the first control plane network element uses an application-based preference as the input to the policy decision of the first control plane network element.

As an option, the first control plane network element uses a subscriber category and an application-based preference as the input to the policy decision of the first control plane network element.

In the embodiments of the present disclosure, downgrading, by the first control plane network element, the Session-AMBR includes: sending by the first control plane network element a first indication message to the second control plane network element, where the first indication message indicates an SM policy association modification for downgrading the Session-AMBR. The first indication message includes at least one of the following information: an S-NSSAI identifier and an authorized Session-AMBR.

As an implementation, the first indication message includes an SM policy association modification message.

As an implementation, the first control plane network element uses analytics information provided by the NWDAF network element as the input to the policy decision of the first control plane network element.

The communication method in the embodiments of the present disclosure is able to systematically and precisely realize the dynamic adjustment of Session-AMBR to meet the limitation of the data rate per network slice, and adjust the data rate per network slice according to the utilized data rate.

FIG. 3 is a flowchart of a communication method according to an embodiment. As shown in FIG. 3, the communication method in the embodiments of the present disclosure includes the following processing steps.

In block 301, a second control plane network element receives a first indication message from a first control plane network element, the first indication message indicates that a data rate for a single network slice selection assistance information (S-NSSAI) reaches a threshold.

The first indication message includes at least one of the following information: an S-NSSAI identifier and an authorized Session-AMBR.

In block 302, the second control plane network element changes the Session-AMBR in response to the first indication message.

The second control plane network element initiates a packet data unit (PDU) session modification procedure to change the Session-AMBR.

The first indication message includes an SM policy association modification message.

FIG. 4 is a flowchart of a communication method according to an embodiment. As shown in FIG. 4, the communication method of the embodiments of the present disclosure is applied to a network device, and the network device includes a control plane network element of a core network element. The communication method of the embodiments of the present disclosure includes the following processing steps.

In block 401, in response to being triggered by a policy decision, a first control plane network element performs a session management (SM) policy association modification procedure initiated by itself, to notify a second control plane network element of a modification of a policy.

In the embodiments of the present disclosure, as an implementation, the first control plane network element includes a PCF network element. The second control plane network element includes a session management function (SMF) network element.

As an example, the PCF performs the SM policy association modification procedure to downgrade a session aggregate maximum bit rate (Session-AMBR), and uses a utilized data rate as an input. The PCF initiates SM policy association modification procedure based on an internal PCF event or triggered by other peers of the PCF, such as application function (AF) network element, a unified data repository (UDR) network element, and a network data analysis function (NWDAF) network element.

In block 402, if a data rate for a single network slice selection assistance information (S-NSSAI) reaches a threshold, the first control plane network element updates a policy and charging control (PCC) rule, and uses a utilized data rate as an input to the policy decision of the first control plane network element.

Notifying the second control plane network element of the modification of the policy includes: sending by the first control plane network element a first indication message to the second control plane network element, where the first indication message indicates to decrease an MBR of a related quality of service (QoS) flow. The first indication message includes at least one of the following information: an S-NSSAI identifier, and an MBR and a GBR corresponding to an SDF. The first indication message includes an SM policy association modification message.

In the embodiments of the present disclosure, as an option, the first control plane network element uses a ratio of the utilized data rate to an accumulated data rate and an MBR per SDF as the input to the policy decision of the first control plane network element.

In the embodiments of the present disclosure, as an option, the first control plane network element uses a subscriber category as the input to the policy decision of the first control plane network element.

As an option, the first control plane network element uses an application-based preference as the input to the policy decision of the first control plane network element.

As an option, the first control plane network element uses a subscriber category and an application-based preference as the input to the policy decision of the first control plane network element.

As an implementation, the first control plane network element uses analytics information provided by the NWDAF network element as the input to the policy decision of the first control plane network element.

Figure 5:
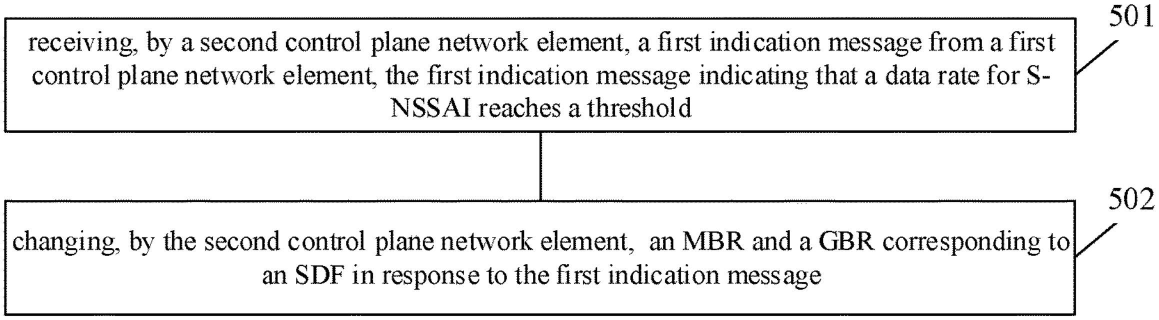
FIG. 5 is a flowchart of a communication method according to an embodiment.

FIG. 5 is a flowchart of a communication method according to an embodiment. As shown in FIG. 5, the communication method in the embodiments of the disclosure includes the following processing steps.

In block 501, a second control plane network element receives a first indication message from a first control plane network element, the first indication message indicates that a data rate for a single network slice selection assistance information (S-NSSAI) reaches a threshold.

The first indication message includes at least one of the following information: an S-NSSAI identifier, and an MBR and a GBR corresponding to an SDF.

In block 502, the second control plane network element changes the MBR and the GBR corresponding to the SDF in response to the first indication message.

Specifically, the second control plane network element enforces an authorized QoS of a service data flow according to the PCC rule.

The first indication message includes an SM policy association modification message.

Figure 6:
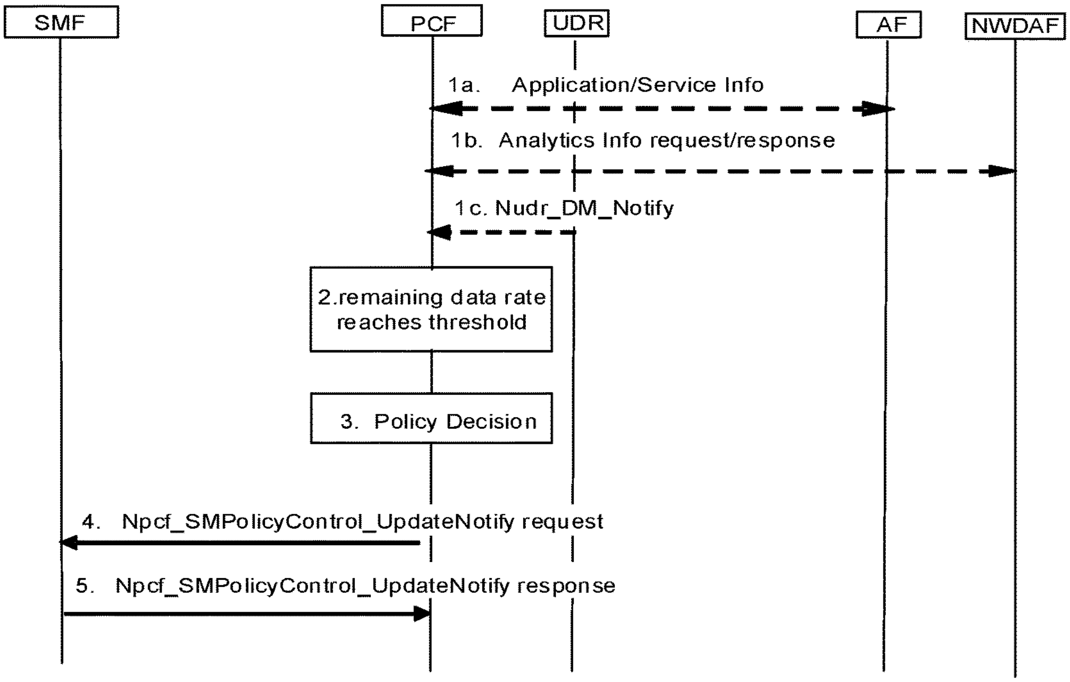
FIG. 6 is a schematic diagram illustrating an interactive communication between a PCF and a SMF according to an embodiment.

FIG. 6 is a schematic diagram illustrating an interactive communication between a PCF and an SMF according to an embodiment. As shown in FIG. 6, the interactive communication between the PCF and the SMF in the embodiments of the present disclosure includes the following processing steps.

In step 1*a*, as an implementation, optionally, the AF provides/revokes service information to the PCF e.g. due to AF session signalling, by invoking an Npcf_PolicyAuthorization_Create request or Npcf_PolicyAuthorization_Update request service operation. The PCF responds to the AF to initiate the Session-AMBR adjustment.

In step 1*b*, as another implementation, the NWDAF services are used to expose slice data rate analytics from the NWDAF to the PCF. The analytics (e.g. Analytics ID) can be requested from the NWDAF. Optionally, an internal event (e.g. a timer, or a local decision based on analytics information requested and received from the NWDAF) occurs at the PCF. The PCF responds to the NWDAF to initiate the Session-AMBR adjustment.

In step 1*c*, as another implementation, the UDR notifies the PCF of a policy subscription change by invoking Nudr_DM_Notify (notification correlation ID, policy data, SUPI, updated data, "PDU session policy control data"/"maximum data rate"). The PCF responds to the UDR.

Step 1*a*, 1*b* or 1*c* may be triggered by the local decision of the PCF, or other peers of the PCF, such as the AF, the NWDAF or the UDR. Before triggering, relevant network elements establish the SM policy association with the PCF. It is ensured that the relevant information received can be used by the PCF for a later policy decision.

In step 2, the PCF determines that the data rate for the S-NSSAI reaches the threshold, and the PCF uses the utilized data rate as the input and makes the policy decision. The PCF initiates the session management policy association modification to downgrade the Session-AMBR, and adjust the slice data rate; or terminates the session management policy association for the slice data rate control if needed.

In step 3, the PCF performs the PCF initiated SM policy association modification procedure, to notify the SMF of the modification of the policy. If the data rate for the S-NSSAI reaches the threshold, the PCF determines that updated policy information (downgrading the Session-AMBR, and using the utilized data rate as the input to the policy decision) needs to be sent to the SMF. The PCF may further decide to subscribe to a new Analytics ID from the NWDAF.

If the AF provides a background data transfer (BDT) reference ID in step 1*a*, the PCF may retrieve it from the UDR by invoking the Nudr_DM_Query (BDT reference ID, policy data, background data transfer) service.

In step 4, if the PCF has determined that the SMF needs the updated policy information in step 3, the PCF issues an Npcf_SMPolicyControl_UpdateNotify request with possibly updated policy information about the PDU session, and the request includes the S-NSSAI identifier and the authorized Session-AMBR.

In step 5, the SMF acknowledges the PCF request with an Npcf_SMPolicyControl_UpdateNotify response. The SMF informs a user port function (UPF) and an NG-RAN to reduce the Session-AMBR for downlink and uplink, respectively. When the UE sends uplink user plane data to the NG-RAN, the NG-RAN enforces uplink data rate limitation(s) for non-GBR flow(s) according to updated Session-AMBR value(s) received from the SMF. For GBR flow(s), if one or more PCC rules are installed or activated in the SMF, the SMF may downgrade the MBR allocated to an SDF template.

If the Npcf_SMPolicyControl_UpdateNotify request is received from a new PCF instance in a PCF set, the SMF stores the SM policy association towards the new PCF instance.

As an alternative, with reference to FIG. 6 where the PCF performs the SM policy association modification procedure to downgrade the Session-AMBR, the PCF may use the ratio of the utilized data rate to the accumulated data rate and the MBR of the SDF as the input. Specifically, the processing steps are as follows.

In step 1*a*, as an implementation, optionally, the AF provides/revokes the service information to the PCF e.g. due to AF session signalling, by invoking the Npcf_PolicyAuthorization_Create request or Npcf_PolicyAuthorization_Update request service operation. The PCF responds to the AF to initiate the Session-AMBR adjustment.

In step 1*b*, as another implementation, the NWDAF services are used to expose the slice data rate analytics from the NWDAF to the PCF. The analytics (e.g. Analytics ID) can be requested from the NWDAF. Optionally, an internal event (e.g. a timer, or a local decision based on analytics information requested and received from the NWDAF) occurs at the PCF. The PCF responds to the NWDAF to initiate the Session-AMBR adjustment.

In step 1*c*, as another implementation, the UDR notifies the PCF of the policy subscription change by invoking Nudr_DM_Notify (notification correlation ID, policy data, SUPI, updated data, "PDU session policy control data"/ "maximum data rate"). The PCF responds to the UDR.

Step 1*a*, 1*b* or 1*c* may be triggered by the local decision of the PCF, or other peers of the PCF, such as the AF, the NWDAF or the UDR. Before triggering, the relevant network elements establish the SM policy association with the PCF. It is ensured that the relevant information received can be used by the PCF for a later policy decision.

In step 2, the PCF determines that the data rate for the S-NSSAI reaches the threshold, and the PCF uses the utilized data rate and the ratio of the utilized data rate to the accumulated data rate and the MBR of the SDF as the input and makes the policy decision. The PCF initiates the session management policy association modification to downgrade the Session-AMBR, and adjust the slice data rate; or terminates the session management policy association for the slice data rate control if needed.

In step 3, the PCF performs the PCF initiated SM policy association modification procedure, to notify the SMF of the modification of the policy. If the data rate for the S-NSSAI reaches the threshold, the PCF determines that updated policy information (downgrading the Session-AMBR, and using the utilized data rate and the ratio of the utilized data rate to the accumulated data rate and the MBR of the SDF as the input to the policy decision) needs to be sent to the SMF. The PCF may further decide to subscribe to a new Analytics ID from the NWDAF.

If the AF provides the background data transfer (BDT) reference ID in step 1*a*, the PCF may retrieve it from the UDR by invoking the Nudr_DM_Query (BDT reference ID, policy data, background data transfer) service.

In step 4, if the PCF has determined that the SMF needs the updated policy information in step 3, the PCF issues the Npcf_SMPolicyControl_UpdateNotify request with possibly updated policy information about the PDU session, and the request includes the S-NSSAI identifier and the authorized Session-AMBR.

In step 5, the SMF acknowledges the PCF request with an Npcf_SMPolicyControl_UpdateNotify response. The SMF informs the UPF and the NG-RAN to reduce the Session-AMBR for downlink and uplink, respectively. When the UE sends uplink user plane data to the NG-RAN, the NG-RAN enforces uplink data rate limitation(s) for non-GBR flow(s) according to the updated Session-AMBR value(s) received from the SMF. For GBR flow(s), if one or more PCC rules are installed or activated in the SMF, the SMF may downgrade the MBR allocated to the SDF template.

In the embodiments, with reference to FIG. 6 where the PCF performs the SM policy association modification procedure to downgrade the Session-AMBR, the PCF may use the utilized data rate and the subscriber category as the input. Specifically, the processing steps are as follows.

In step 1*a*, as an implementation, optionally, the AF provides/revokes the service information to the PCF e.g. due to AF session signalling, by invoking the Npcf_PolicyAuthorization_Create request or Npcf_PolicyAuthorization_Update request service operation. The PCF responds to the AF to initiate the Session-AMBR adjustment.

In step 1*b*, as another implementation, the NWDAF services are used to expose the slice data rate analytics from the NWDAF to the PCF. The analytics (e.g. Analytics ID) can be requested from the NWDAF. Optionally, an internal event (e.g. a timer, or a local decision based on analytics information requested and received from the NWDAF) occurs at the PCF. The PCF responds to the NWDAF to initiate the Session-AMBR adjustment.

In step 1*c*, as another implementation, the UDR notifies the PCF of the policy subscription change by invoking Nudr_DM_Notify (notification correlation ID, policy data, SUPI, updated data, "PDU session policy control data"/ "maximum data rate"). The PCF responds to the UDR.

Step 1*a*, 1*b* or 1*c* may be triggered by the local decision of the PCF, or other peers of the PCF, such as the AF, the NWDAF or the UDR. Before triggering, the relevant network elements establish the SM policy association with the PCF. It is ensured that the relevant information received can be used by the PCF for a later policy decision.

In step 2, the PCF determines that the data rate for the S-NSSAI reaches the threshold, and the PCF uses the utilized data rate and the subscriber category as the input and makes the policy decision. The PCF initiates the session management policy association modification to downgrade the Session-AMBR, and adjust the slice data rate; or terminates the session management policy association for the slice data rate control if needed.

In step 3, the PCF performs the PCF initiated SM policy association modification procedure, to notify the SMF of the modification of the policy. If the data rate for the S-NSSAI reaches the threshold, the PCF determines that updated policy information (downgrading the Session-AMBR, and using the utilized data rate and the subscriber category as the input to the policy decision) needs to be sent to the SMF. The PCF may further decide to subscribe to a new Analytics ID from the NWDAF.

If the AF provides the BDT reference ID in step 1*a*, the PCF may retrieve it from the UDR by invoking the Nudr_DM_Query (BDT reference ID, policy data, background data transfer) service.

In step 4, if the PCF has determined that the SMF needs the updated policy information in step 3, the PCF issues the Npcf_SMPolicyControl_UpdateNotify request with possibly updated policy information about the PDU session, and the request includes the S-NSSAI identifier and the authorized Session-AMBR.

In step 5, the SMF acknowledges the PCF request with an Npcf_SMPolicyControl_UpdateNotify response. The SMF informs the UPF and the NG-RAN to reduce the Session-AMBR for downlink and uplink, respectively. When the UE sends uplink user plane data to the NG-RAN, the NG-RAN enforces uplink data rate limitation(s) for non-GBR flow(s) according to the updated Session-AMBR value(s) received from the SMF. For GBR flow(s), if one or more PCC rules are installed or activated in the SMF, the SMF may downgrade the MBR allocated to the SDF template.

In the embodiments, with reference to FIG. 6 where the PCF performs the SM policy association modification procedure to downgrade the Session-AMBR, the PCF may use the utilized data rate and the application-based preference as the input. Specifically, the processing steps are as follows.

In step 1*a*, as an implementation, optionally, the AF provides/revokes the service information to the PCF e.g. due to AF session signalling, by invoking the Npcf_PolicyAuthorization_Create request or Npcf_PolicyAuthorization_Update request service operation. The PCF responds to the AF to initiate the Session-AMBR adjustment.

In step 1*b*, as another implementation, the NWDAF services are used to expose the slice data rate analytics from the NWDAF to the PCF. The analytics (e.g. Analytics ID) can be requested from the NWDAF. Optionally, an internal event (e.g. a timer, or a local decision based on analytics information requested and received from the NWDAF) occurs at the PCF. The PCF responds to the NWDAF to initiate the Session-AMBR adjustment.

In step 1*c*, as another implementation, the UDR notifies the PCF of the policy subscription change by invoking Nudr_DM_Notify (notification correlation ID, policy data, SUPI, updated data, "PDU session policy control data"/"maximum data rate"). The PCF responds to the UDR.

Step 1*a*, 1*b* or 1*c* may be triggered by the local decision of the PCF, or other peers of the PCF, such as the AF, the NWDAF or the UDR. Before triggering, the relevant network elements establish the SM policy association with the PCF. It is ensured that the relevant information received can be used by the PCF for a later policy decision.

In step 2, the PCF determines that the data rate for the S-NSSAI reaches the threshold, and the PCF uses the utilized data rate and the application-based preference as the input and makes the policy decision. The PCF initiates the session management policy association modification to downgrade the Session-AMBR, and adjust the slice data rate; or terminates the session management policy association for the slice data rate control if needed.

The application-based preference includes preferred application(s) in a timely and efficient manner. For example, UE1 prefers playing a VR game during office breaks, and prefers a streaming service during a rest time after 9 PM. An application-based preference profile may be preset or established by the 5G System based on a usage pattern of the UE.

In step 3, the PCF performs the PCF initiated SM policy association modification procedure, to notify the SMF of the modification of the policy. If the data rate for the S-NSSAI reaches the threshold, the PCF determines that updated policy information (downgrading the Session-AMBR, and using the utilized data rate and the application-based preference as the input to the policy decision) needs to be sent to the SMF. The PCF may further decide to subscribe to a new Analytics ID from the NWDAF.

If the AF provides the BDT reference ID in step 1*a*, the PCF may retrieve it from the UDR by invoking the Nudr_DM_Query (BDT reference ID, policy data, background data transfer) service.

In step 4, if the PCF has determined that the SMF needs the updated policy information in step 3, the PCF issues the Npcf_SMPolicyControl_UpdateNotify request with possibly updated policy information about the PDU session, and the request includes the S-NSSAI identifier and the authorized Session-AMBR.

In step 5, the SMF acknowledges the PCF request with an Npcf_SMPolicyControl_UpdateNotify response. The SMF informs the UPF and the NG-RAN to reduce the Session-AMBR for downlink and uplink, respectively. When the UE sends uplink user plane data to the NG-RAN, the NG-RAN enforces uplink data rate limitation(s) for non-GBR flow(s) according to the updated Session-AMBR value(s) received from the SMF. For GBR flow(s), if one or more PCC rules are installed or activated in the SMF, the SMF may downgrade the MBR allocated to the SDF template.

Figure 7:
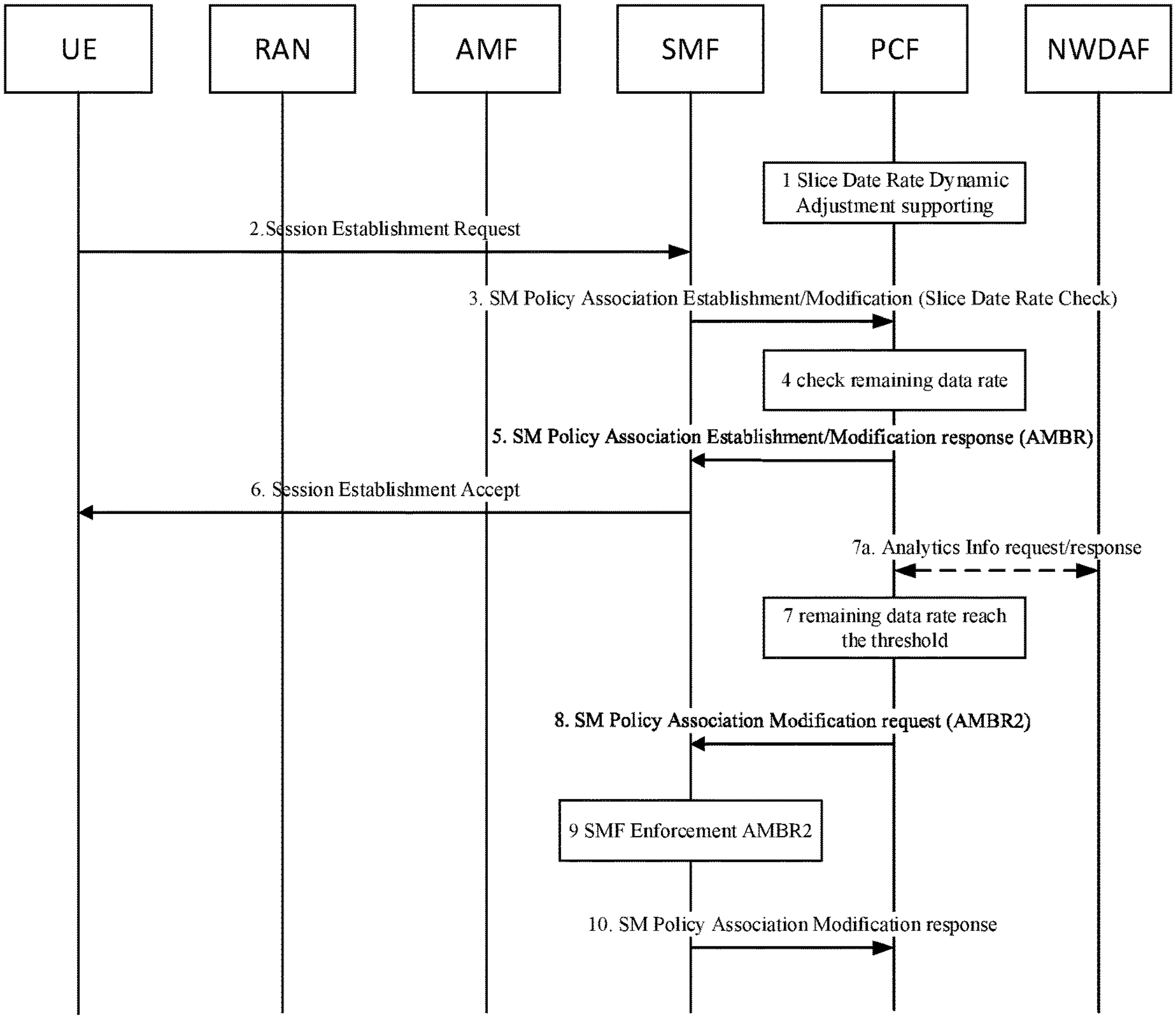
FIG. 7 is a schematic diagram illustrating communication for a UE-requested session establishment according to an embodiment.

FIG. 7 is a schematic diagram illustrating communication for a UE-requested session establishment according to an embodiment. As shown in FIG. 7, a UE-requested session establishment and modification procedure with slice data rate dynamic adjustment in the embodiments of the present disclosure includes the following processing steps.

In step 1, the PCF supports monitoring and enforcement of a total bandwidth per S-NSSAI, and may receive slice specific policy control information per S-NSSAI from the UDR.

In step 2, the UE initiates a PDU session establishment procedure, and session establishment information includes the S-NSSAI (from the UE to the AMF, the AMF selects the SMF and initiates the PDU session establishment, which is the same as described in TS 23.501, and thus is not elaborated here).

In step 3, the SMF may perform an SM policy association establishment procedure to establish the SM policy association with the PCF and obtain a default PCC rule for the PDU session. If a request type in step 2 indicates "existing PDU session", the SMF may provide information on policy control request trigger condition(s) that may have been met by the SMF initiated SM policy association modification procedure. The SMF sends a data rate check request to the PCF, and the request includes S-NSSAI, UE-ID, PDU session ID, Session-AMBR and MFBR values for all GBR flows to be established.

In step 4, the PCF check whether the slice data rate for the S-NSSAI reaches the threshold or not. The threshold may be set by an operator policy according to the total slice bandwidth. The PCF deduct a value of the authorized Session-AMBR allocated to the PDU session from the data rate for the S-NSSAI and store it in the UDR.

In step 5, if the data rate for the S-NSSAI does not reach the threshold, the PCF provides the policy information on the Session-AMBR or the MBR for UL and/or DL to the SMF (which is the same as described in TS 23.503 and 23.502).

In step 6, the SMF sends a PDU session response to the UE (i.e. sends to the AMF and is forwarded to the RAN and the UE, which is the same as described in TS 23.501).

In step 7*a*, alternatively, the NWDAF services are used to expose the slice data rate analytics from the NWDAF to the PCF. The analytics (i.e. Analytics ID) may be requested from the NWDAF. Optionally, the internal event (e.g. a timer, or a local decision based on analytics information requested and received from the NWDAF) occurs at the PCF.

In step 7, if the data rate for the S-NSSAI reaches the threshold, the PCF may use the utilized data rate as the input and make the policy decision. The PCF initiates the session management policy association modification to update the downgraded Session-AMBR, and adjust the slice data rate. The PCF performs the PCF initiated SM policy association modification procedure, to notify the SMF of the modification of policy. The PCF may determine that the updated policy information (downgrading the Session-AMBR, and using the utilized data rate as the input to the policy decision) needs to be sent to the SMF. The PCF may further decide to subscribe to a new Analytics ID from the NWDAF.

In step 9, if the PCF has determined that the SMF needs the updated policy information in step 8, the PCF issues an Npcf_SMPolicyControl_UpdateNotify request with possibly updated policy information about the PDU Session, and the request includes the S-NSSAI identifier and the authorized Session-AMBR.

In step 10, the SMF acknowledges the PCF request with the Npcf_SMPolicyControl_UpdateNotify response. The SMF may request a PDU session modification procedure, inform the UPF and the NG-RAN to reduce the Session-AMBR for the downlink and uplink, respectively. When the UE sends the uplink user plane data to the NG-RAN, the NG-RAN enforces the uplink data rate limitation(s) for the non-GBR flow(s) according to the updated Session-AMBR value(s) received from the SMF, which is the same as described in TS 23.501. For the GBR flow(s), if one or more PCC rules are installed or activated in the SMF, the SMF may downgrade the MBR allocated to the SDF template.

Figure 8:
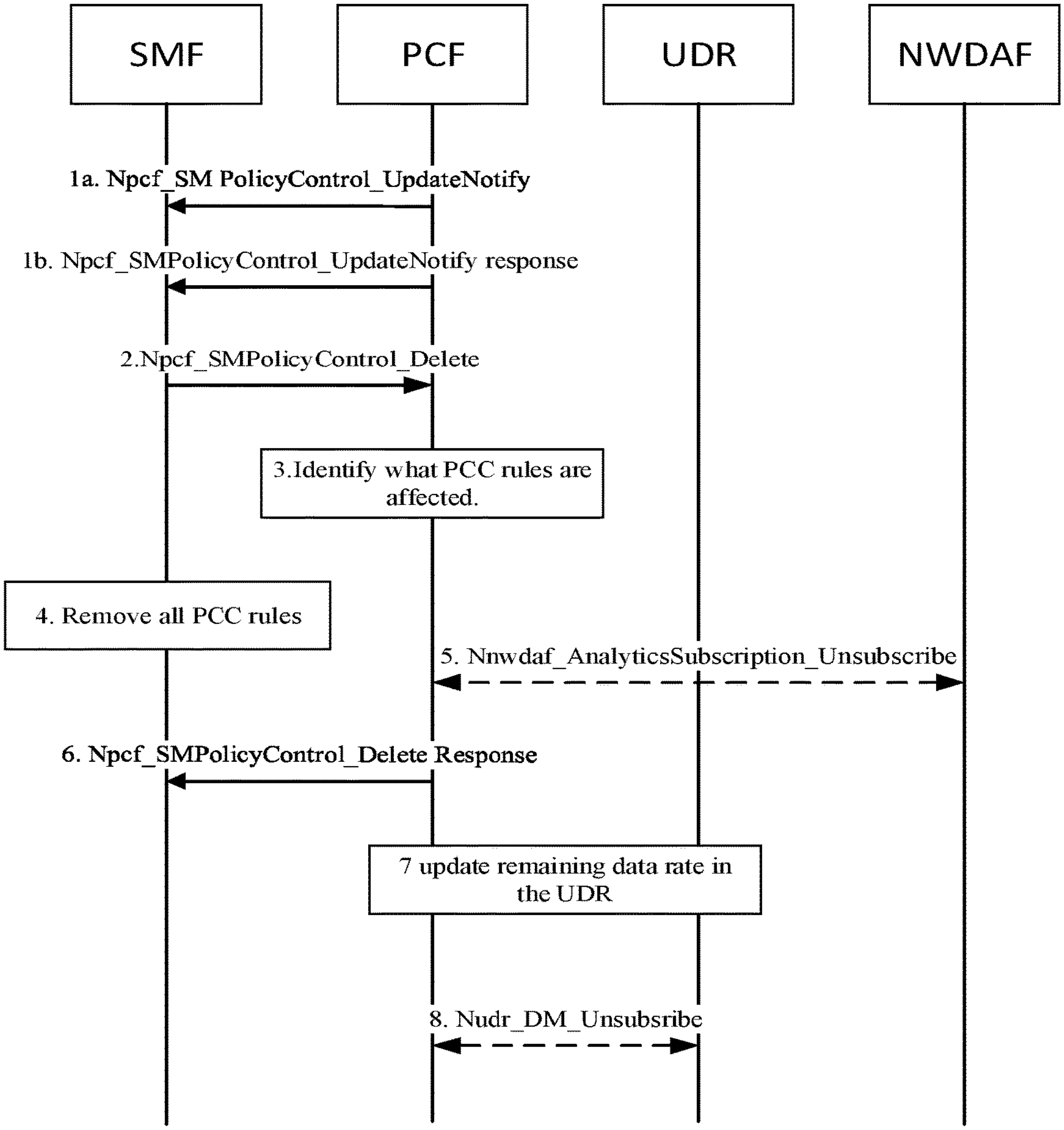
FIG. 8 is a schematic diagram illustrating communication for session management (SM) policy association termination according to an embodiment.

FIG. 8 is a schematic diagram illustrating communication for session management (SM) policy association termination according to an embodiment. As shown in FIG. 8, a procedure for the session management policy termination may be initiated by the PCF or the SMF.

In step 1, the PCF may invoke the Npcf_SMPolicyControl_UpdateNotify service operation to request release of a PDU session. The SMF acknowledges the request.

In step 2, the SMF may invoke the Npcf_SMPolicyControl_Delete service operation to request a deletion of the SM policy association with the PCF. The SMF provides relevant information to the PCF.

In step 3, when receiving the request in step 2, the PCF finds the PCC rule to be notified to the AF and removes the PCC rule for the PDU Session.

If the PCC rule reported by the SMF is removed, and the PCF supports monitoring and enforcement of a total bandwidth per S-NSSAI, the PCF will update the data rate for the S-NSSAI in the UDR.

In step 4, the SMF removes all PDU session policy information associated with the PDU session.

In step 5, the PCF may unsubscribe to analytics from the NWDAF.

In step 6, the PCF removes information related to the terminated PDU session and acknowledges to the SMF that the PCF handling of the PDU session has terminated. This interaction is a response to the SMF request in step 2.

In step 7, the PCF updates the data rate for the S-NSSAI in the UDR.

In step 8, if the PCF had subscribed a notification, the PCF may unsubscribe to the notification of the PDU session related data modification from the UDR by invoking Nudr_DM_Unsubscribe (subscription correlation ID) (e.g. if it is the last PDU session on a couple (DNN, S-NSSAI)).

Figure 9:
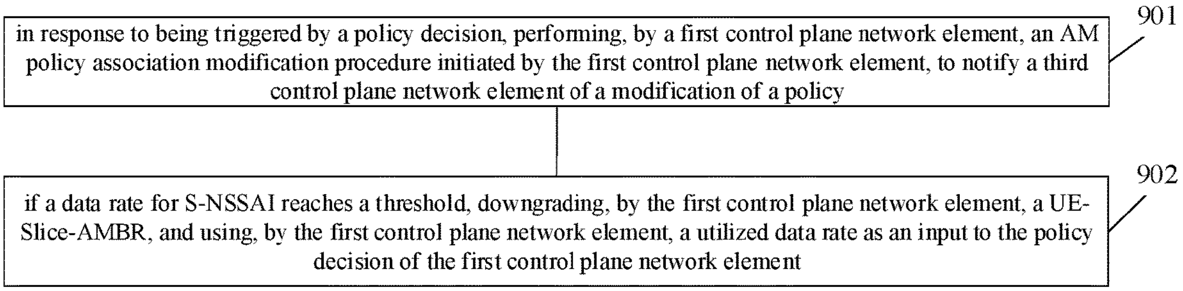
FIG. 9 is a flowchart of a communication method according to an embodiment.

FIG. 9 is a flowchart of a communication method according to an embodiment. As shown in FIG. 9, the communication method in the embodiments of the present disclosure includes the following processing steps.

In block 901, in response to being triggered by a policy decision, a first control plane network element performs an access and mobility management (AM) policy association modification procedure initiated by itself, to notify a third control plane network element of a modification of a policy.

In the embodiments of the present disclosure, as an implementation, the first control plane network element includes a PCF network element. The second control plane network element includes an access and mobility management function (AMF) network element.

In block 902, if a data rate for a single network slice selection assistance information (S-NSSAI) reaches a threshold, the first control plane network element downgrades a UE-Slice-AMBR, and uses a utilized data rate as an input to the policy decision of the first control plane network element.

Downgrading the UE-Slice-AMBR by the first control plane network element includes: sending, by the first control plane network element, a second indication message to the third control plane network element, where the second indication message indicates an AM policy association modification for downgrading the UE-Slice-AMBR.

The second indication message includes at least one of the following information: a single network slice selection assistance information (S-NSSAI) identifier and an authorized UE-Slice-AMBR.

The second indication message indicates an AM policy association modification message.

As an option, the first control plane network element uses a ratio of the utilized data rate to an accumulated data rate and a maximum bit rate (MBR) per service data flow (SDF) as the input to the policy decision of the first control plane network element.

As an option, the first control plane network element uses a subscriber category as the input to the policy decision of the first control plane network element.

As an option, the first control plane network element uses an application-based preference as the input to the policy decision of the first control plane network element.

As an option, the first control plane network element uses a subscriber category and an application-based preference as the input to the policy decision of the first control plane network element.

As an option, the first control plane network element uses analytics information provided by a network data analysis function (NWDAF) network element as the input to the policy decision of the first control plane network element.

Figure 10:
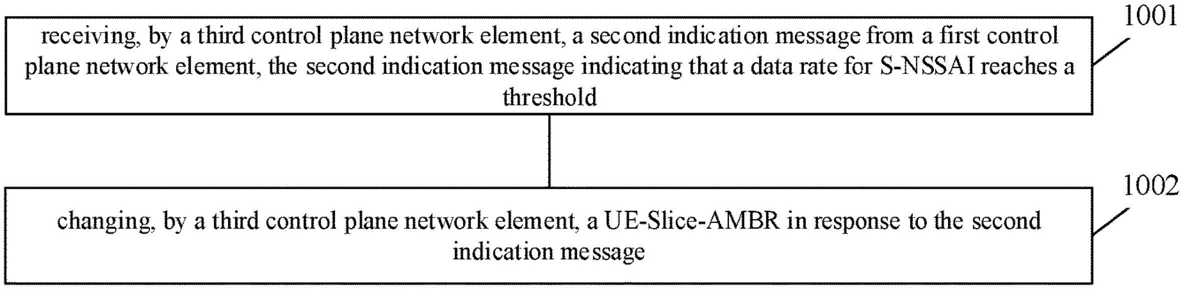
FIG. 10 is a flowchart of a communication method according to an embodiment.

FIG. 10 is a flowchart of a communication method according to an embodiment. As shown in FIG. 10, the communication method according to the embodiments of the present disclosure includes the following steps.

In block 1001, a third control plane network element receives a second indication message from a first control plane network element, the second indication message indicating that a data rate for an S-NSSAI reaches a threshold.

The second indication message includes at least one of the following information: an S-NSSAI identifier and an authorized UE-Slice-AMBR. The second indication message includes an AM policy association modification message.

In block 1002, the third control plane network element changes a user equipment-slice-aggregate maximum bit rate (UE-Slice-AMBR) in response to the second indication message.

Specifically, the third control plane network element initiates a packet data unit (PDU) session modification procedure to change the UE-Slice-AMBR.

An AM policy association modification procedure initiated by the AMF is described in details below, to downgrade the UE-Slice-AMBR by using the utilized data rate as the input. This procedure is applicable to a situation where a trigger condition of the policy control request is met, and the procedure is initiated by the AMF.

Figure 11:
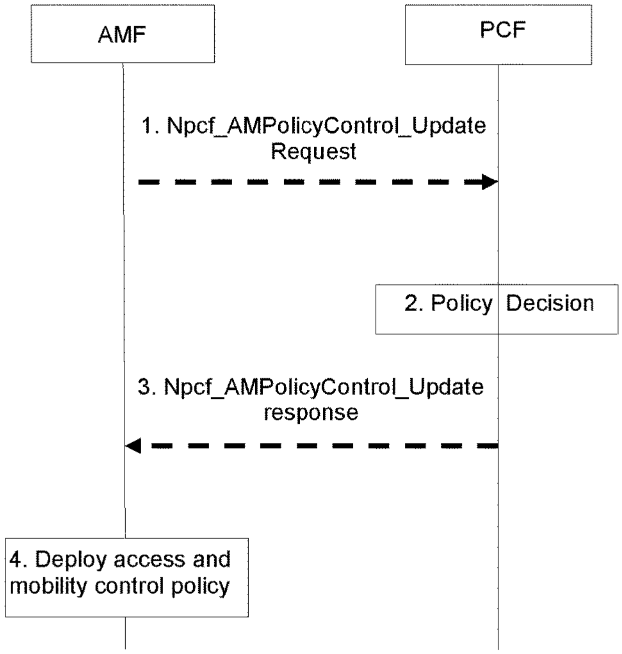
FIG. 11 is a schematic diagram of communication for an AM policy association modification according to an embodiment.

FIG. 11 is a schematic diagram of communication for an AM policy association modification according to an embodiment. As shown in FIG. 11, in the case of non-roaming, the role of a visited PCF (V-PCF) is performed by the PCF. For the case of roaming, the V-PCF interacts with the AMF. The communication method for the embodiment includes the following steps.

In step 1, when a policy control request trigger condition is met, the AMF updates the AM policy association and provides information on a condition that has changed to the PCF by invoking Npcf_AMPolicyControl_Update. For example, the UE-Slice-AMBR changes when the data rate for the S-NSSAI reaches the threshold.

In step 2, the (V-)PCF stores the information received in step 1 and makes the policy decision. In the non-roaming case, the PCF may subscribe to the analytics from the NWDAF.

If the data rate for the S-NSSAI reaches the threshold, the PCF may use the utilized data rate as the input and make the policy decision. The PCF sends an AM policy association modification response to downgrade the UE-Slice-AMBR and adjust the slice data rate, the response includes the S-NSSAI identifier and the UE-Slice-AMBR. The information as the input may be in any one of the utilized data rate, the ratio of the utilized data rate to the accumulated data rate and the MBR per SDF in the network slice, the subscriber category and the application-based preference.

In step 3, the (V-)PCF responds to the AMF with updated access and mobility related policy control information and updated policy control request trigger parameter(s).

In step 4, the AMF deploys the access and mobility control policy, which includes storing a service area restriction and policy control request trigger of the AM policy association, provisioning the service area restriction to the UE and provisioning a frequency selection priority (RFSP) index, the UE-AMBR, the UE-Slice-MBR and the service area restriction to the NG-RAN.

The following procedure is applicable to the AM policy association modification initiated by the PCF. The procedure driven by an internal PCF event is applicable to both roaming and non-roaming situations. When driven by the NWDAF, the procedure applies only to the non-roaming situation. In the non-roaming case, the role of the V-PCF is performed by the PCF. For the roaming case, the V-PCF interacts with the AMF. The V-PCF/PCF stores the access and mobility control policy information provided to the AMF.

Figure 12:
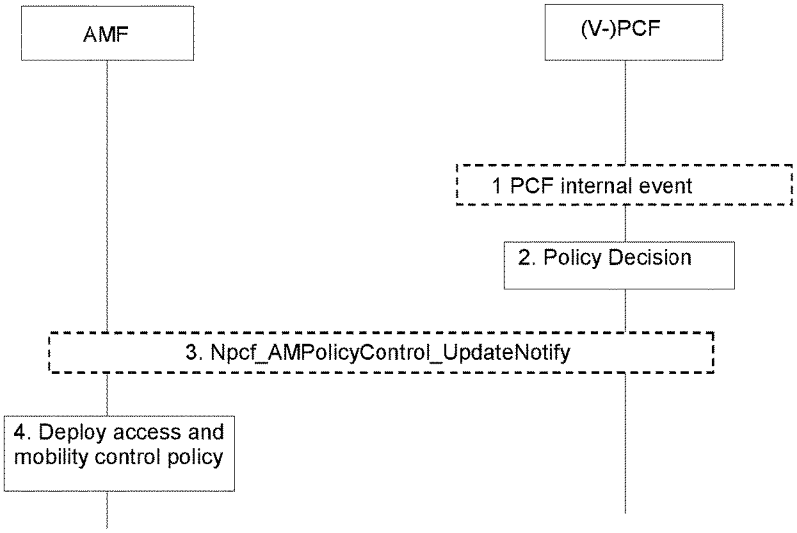
FIG. 12 is a schematic diagram of communication for an AM policy association modification initiated by a PCF according to an embodiment.

FIG. 12 is a schematic diagram of communication for an AM policy association modification initiated by a PCF according to an embodiment. As shown in FIG. 12, the AM policy association modification procedure may be initiated by an internal PCF event or by pertinent analytics information obtained from the NWDAF by the PCF. The communication for the embodiment includes the following steps.

In step 1, the PCF determines internally that a new status of a UE context requires a new policy, which is potentially triggered by a notification from the UDR, or may be triggered by obtaining the pertinent analytics information from the NWDAF.

In step 2, the (V-)PCF in the case of roaming or the PCF in the case of non-roaming makes the policy decision. The PCF may further decide to subscribe to a new Analytics ID from the NWDAF.

If the data rate for the S-NSSAI reaches the threshold, the PCF may use the utilized data rate as the input and make the policy decision. The PCF sends the Npcf_AMPolicyControl_UpdateNotify to downgrade the UE-Slice-AMBR and adjust the slice data rate, the information sent includes the S-NSSAI identifier and the UE-Slice-AMBR. The input information may be any one of the utilized data rate, the ratio of the utilized data rate to the accumulated data rate and the MBR per SDF in the network slice, the subscriber category and the application-based preference.

In step 3, the (V-)PCF in the case of roaming or the PCF in the case of non-roaming sends Npcf_AMPolicyControl_UpdateNotify including AM policy association ID associated with the SUPI. The policy update may include the service area restriction, the UE-AMBR, the UE-Slice-MBR or the RFSP index value. If the AF has previously subscribed to an event request for allocation of service area coverage outcome in step 1, the (V-)PCF checks if the allocated service area coverage is changed and sends a respective notification to the AF using Npcf_AMPolicyAuthorization_Notify as defined in clause 6.3.1.18 in TS 23.503 [20].

In step 4, the AMF deploys and stores updated access and mobility related policy information, which includes storing the service area restriction and the policy control request trigger of the AM policy association, provisioning of the service area restriction to the UE and provisioning the RFSP index, the UE-Slice-MBR and the service area restriction to the NG-RAN.

Figure 13:
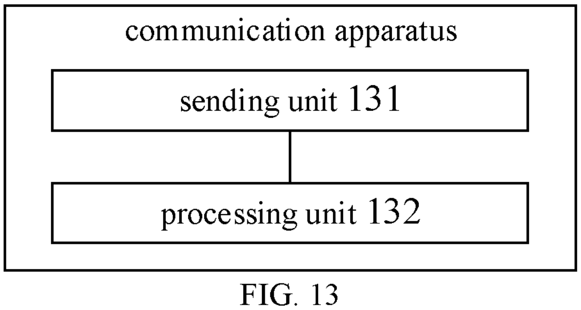
FIG. 13 is a schematic diagram showing composition and structure of a communication apparatus according to an embodiment.

FIG. 13 is a schematic diagram showing composition and structure of a communication apparatus according to an embodiment. As shown in FIG. 13, the communication apparatus includes a sending unit 131 and a processing unit 132. The sending unit 131 is configured to, in response to being triggered by a policy decision, perform a session management (SM) policy association modification procedure initiated by a first control plane network element, to notify a second control plane network element of a modification of a policy. The processing unit 132 is configured to use a utilized data rate as an input to the policy decision and downgrade a session aggregate maximum bit rate (Session-AMBR) if a data rate for single network slice selection assistance information (S-NSSAI) reaches a threshold.

As an implementation, the processing unit 132 is further configured to: use a ratio of the utilized data rate to an accumulated data rate and a maximum bit rate (MBR) per service data flow (SDF) as the input to the policy decision of the first control plane network element; or use a subscriber category as the input to the policy decision of the first control plane network element; or use an application-based preference as the input to the policy decision of the first control plane network element; or use a subscriber category and an application-based preference as the input to the policy decision of the first control plane network element; or use analytics information provided by a network data analysis function (NWDAF) network element as the input to the policy decision of the first control plane network element.

As an implementation, the sending unit 131 is further configured to send a first indication message to the second control plane network element, where the first indication message indicates an SM policy association modification for downgrading the Session-AMBR.

In an embodiment, the sending unit 131 and the processing unit 132 may be implemented by one or more central processing units (CPUs), graphics processing units (GPUs), baseband processors (BPs), application specific integrated circuits (ASICs), digital signal processors (DSPs), programmable logic devices (PLDs), complex programmable logic devices (CPLDs), field-programmable gate arrays (FPGAs), general-purpose processors, controllers, micro controller units (MCUs), microprocessors or other electronic components, or may be implemented in combination with one or more radio frequency (RF) antennas, for executing the steps of the communication method in the embodiments.

In the embodiments of the present disclosure, specific manners of performing operations by each unit in the illustrated communication apparatus have been described in detail in the embodiments of the method, and will not be described in detail here.

Figure 14:
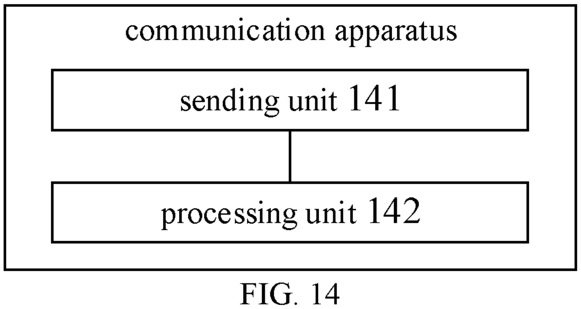
FIG. 14 is a schematic diagram showing composition and structure of a communication apparatus according to an embodiment.

FIG. 14 is a schematic diagram showing composition and structure of a communication apparatus according to an embodiment. As shown in FIG. 14, the apparatus of the embodiment of the present disclosure includes a sending unit 141 and a processing unit 142. The sending unit 141 is configured to, in response to being triggered by a policy decision, perform a session management (SM) policy association modification procedure initiated by a first control plane network element, to notify a second control plane network element of a modification of a policy. The processing unit 142 is configured to update a policy and charging control (PCC) rule and use a utilized data rate as an input to the policy decision of the first control plane network element if a data rate for single network slice selection assistance information (S-NSSAI) reaches a threshold.

As an implementation, the processing unit 142 is further configured to use a ratio of the utilized data rate to an accumulated data rate and a maximum bit rate (MBR) per service data flow (SDF) as the input to the policy decision of the first control plane network element; or use a subscriber category as the input to the policy decision of the first control plane network element; or use an application-based preference as the input to the policy decision of the first control plane network element; or use a subscriber category and an application-based preference as the input to the policy decision of the first control plane network element; or use analytics information provided by a network data analysis function (NWDAF) network element as the input to the policy decision of the first control plane network element.

The sending unit 141 is further configured to send a first indication message to the second control plane network element, where the first indication message indicates decreasing an MBR of a related quality of service (QoS) flow.

In an embodiment, the sending unit 141 and the processing unit 142 may be implemented by one or more central processing units (CPUs), graphics processing units (GPUs), baseband processors (BPs), application specific integrated circuits (ASICs), digital signal processors (DSPs), programmable logic devices (PLDs), complex programmable logic devices (CPLDs), field-programmable gate arrays (FPGAs), general-purpose processors, controllers, micro controller units (MCUs), microprocessors or other electronic components, or may be implemented in combination with one or more radio frequency (RF) antennas, for executing the steps of the communication method in the embodiments.

In the embodiments of the present disclosure, specific manners of performing operations by each unit in the illustrated communication apparatus have been described in detail in the embodiments of the method, and will not be described in detail here.

Figure 15:
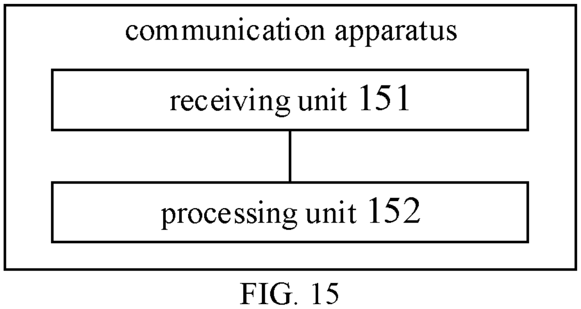
FIG. 15 is a schematic diagram showing composition and structure of a communication apparatus according to an embodiment.

FIG. 15 is a schematic diagram showing composition and structure of a communication apparatus according to an embodiment. As shown in FIG. 15, the communication apparatus includes a receiving unit 151 and a processing 152. The receiving unit 151 is configured to receive a first indication message from a first control plane network element, the first indication message indicating that a data rate for single network slice selection assistance information (S-NSSAI) reaches a threshold. The processing unit 152 is configured to change a session aggregate maximum bit rate (Session-AMBR) in response to the first indication message.

The first indication message includes at least one of the following: an S-NSSAI identifier and an authorized Session-AMBR.

Based on the communication apparatus as shown in FIG. 15, the communication apparatus of the embodiments of the present disclosure further includes an initiating unit (not shown in the figure) configured to initiate a packet data unit (PDU) session modification procedure to change the Session-AMBR.

Alternatively, the first indication message includes at least one of the following information: an S-NSSAI identifier, and the MBR and the GBR corresponding to the SDF. Correspondingly, the processing unit 152 is further configured to perform an authorized quality of service (QoS) of a service data flow according to a policy and charging control (PCC) rule.

In an embodiment, the receiving unit 151 and the processing unit 152 may be implemented by one or more central processing units (CPUs), graphics processing units (GPUs), baseband processors (BPs), application specific integrated circuits (ASICs), digital signal processors (DSPs), programmable logic devices (PLDs), complex programmable logic devices (CPLDs), field-programmable gate arrays (FPGAs), general-purpose processors, controllers, micro controller units (MCUs), microprocessors or other electronic components, or may be implemented in combination with one or more radio frequency (RF) antennas, for executing the steps of the communication method in the embodiments.

In the embodiments of the present disclosure, specific manners of performing operations by each unit in the illustrated communication apparatus have been described in detail in the embodiments of the method, and will not be described in detail here.

Embodiments of the present disclosure further provide a communication apparatus, including: a receiving unit configured to receive a first indication message from a first control plane network element, the first indication message indicating that a data rate for single network slice selection assistance information (S-NSSAI) reaches a threshold; and a processing unit configured to change a maximum bit rate (MBR) and a guaranteed bit rate (GBR) corresponding to a service data flow (SDF) in response to the first indication message.

The first indication message includes at least one of the following information: an S-NSSAI identifier, and the MBR and the GBR corresponding to the SDF. The processing unit is further configured to perform an authorized quality of service (QoS) of a service data flow according to a policy and charging control (PCC) rule.

Figure 16:
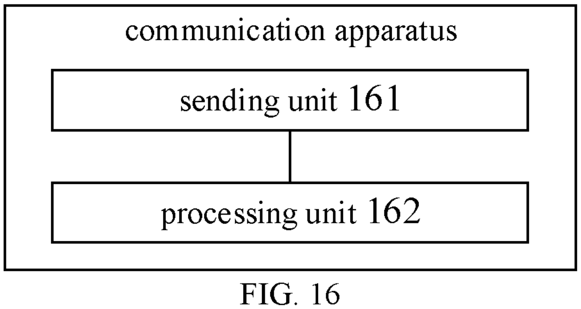
FIG. 16 is a schematic diagram showing composition and structure of a communication apparatus according to an embodiment.

FIG. 16 is a schematic diagram showing composition and structure of a communication apparatus according to an embodiment. As shown in FIG. 16, the communication apparatus includes a sending unit 161 and a processing unit 162. The sending unit 161 is configured to, in response to being triggered by a policy decision, perform an access and mobility management (AM) policy association modification procedure initiated by a first control plane network element, to notify a third control plane network element of a modification of a policy. The processing unit 162 is configured to downgrade a user equipment-slice-aggregate maximum bit rate (UE-Slice-AMBR) and use a utilized data rate as an input to the policy decision of the first control plane network element if a data rate for single network slice selection assistance information (S-NSSAI) reaches a threshold.

As an implementation, the processing unit 162 is further configured to: use a ratio of the utilized data rate to an accumulated data rate and a maximum bit rate (MBR) per service data flow (SDF) as the input to the policy decision of the first control plane network element; or use a subscriber category as the input to the policy decision of the first control plane network element; or use an application-based preference as the input to the policy decision of the first control plane network element; or use a subscriber category and an application-based preference as the input to the policy decision of the first control plane network element; or use analytics information provided by a network data analysis function (NWDAF) network element as the input to the policy decision of the first control plane network element.

The sending unit 161 is further configured to send a second indication message to the third control plane network element, where the second indication message indicates an AM policy association modification for downgrading the UE-Slice-AMBR.

In an embodiment, the sending unit 161 and the processing unit 162 may be implemented by one or more central processing units (CPUs), graphics processing units (GPUs), baseband processors (BPs), application specific integrated circuits (ASICs), digital signal processors (DSPs), programmable logic devices (PLDs), complex programmable logic devices (CPLDs), field-programmable gate arrays (FPGAs), general-purpose processors, controllers, micro controller units (MCUs), microprocessors or other electronic components, or may be implemented in combination with one or more radio frequency (RF) antennas, for executing the steps of the communication method in the embodiments.

In the embodiments of the present disclosure, specific manners of performing operations by each unit in the illustrated communication apparatus have been described in detail in the embodiments of the method, and will not be described in detail here.

Figure 17:
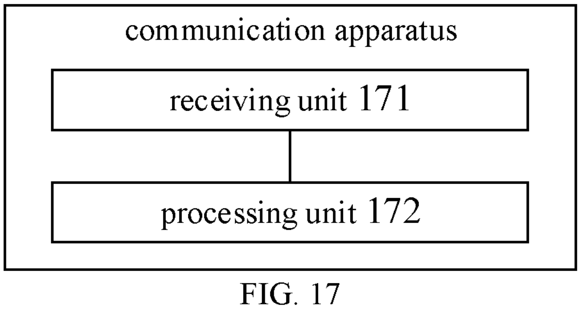
FIG. 17 is a schematic diagram showing composition and structure of a communication apparatus according to an embodiment.

FIG. 17 is a schematic diagram showing composition and structure of a communication apparatus according to an embodiment. As shown in FIG. 17, the communication apparatus includes a receiving unit 171 and a processing unit 172. The receiving unit 171 is configured to receive a second indication message from a first control plane network element, the second indication message indicating that a data rate for single network slice selection assistance information (S-NSSAI) reaches a threshold. The processing unit is configured to change a user equipment-slice-aggregate maximum bit rate (UE-Slice-AMBR) in response to the second indication message.

The second indication message includes at least one of the following information: a single network slice selection assistance information (S-NSSAI) identifier and an authorized UE-Slice-AMBR.

Based on the communication apparatus as shown in FIG. 17, the communication apparatus of the embodiments of the present disclosure further includes an initiating unit (not shown in the figure) configured to initiate a packet data unit (PDU) session modification procedure to change the UE-Slice-AMBR.

In an embodiment, the receiving unit 171 and the processing unit 172 may be implemented by one or more central processing units (CPUs), graphics processing units (GPUs), baseband processors (BPs), application specific integrated circuits (ASICs), digital signal processors (DSPs), programmable logic devices (PLDs), complex programmable logic devices (CPLDs), field-programmable gate arrays (FPGAs), general-purpose processors, controllers, micro controller units (MCUs), microprocessors or other electronic components, or may be implemented in combination with one or more radio frequency (RF) antennas, for executing the steps of the communication method in the embodiments.

In the embodiments of the present disclosure, specific manners of performing operations by each unit in the illustrated communication apparatus have been described in detail in the embodiments of the method, and will not be described in detail here.

Embodiments of the present disclosure further provide a first network device such as the PCF, including a processor, a transceiver, a memory, and a processor-executable program stored in the memory that, when executed by the processor, causes steps of the communication method according to any one of above embodiments to be implemented.

Embodiments of the present disclosure further provide a second network device such as SMF, including a processor, a transceiver, a memory, and a processor-executable program stored in the memory that, when executed by the processor, causes steps of the communication method according to any one of the above embodiments to be implemented.

Embodiments of the present disclosure further provide a third network device such as the AMF, including a processor, a transceiver, a memory, and a processor-executable program stored in the memory that, when executed by the processor, causes steps of the communication method according to any one of the above embodiments to be implemented.

Embodiments of the present disclosure further provide a communication system at least including a first control plane network element and a second control plane network element. The first control plane network element is configured to initiate a session management (SM) policy association modification procedure, to notify the second control plane network element of a modification of a policy with an authorized session aggregate maximum bit rate (Session-AMBR) when a data rate for single network slice selection assistance information (S-NSSAI) reaches a threshold. The second control plane network element is configured to acknowledge a request from the first control plane network element and initiate a packet data unit (PDU) session modification procedure to change the Session-AMBR.

Embodiments of the present disclosure further provide a communication system at least including a first control plane network element and a second control plane network element. The first control plane network element is configured as a policy control function (PCF) configured to initiate a session management (SM) policy association modification procedure, to notify the second control plane network element of a modification of a policy with a maximum bit rate (MBR) and a guaranteed bit rate (GBR) corresponding to a service data flow (SDF) when a data rate for single network slice selection assistance information (S-NSSAI) reaches a threshold. The second control plane network element is configured to acknowledge a request from the first control plane network element and enforce an authorized quality of service (QoS) of the service data flow according to a policy and charging control (PCC) rule.

As an implementation, in the embodiments of the present disclosure, the first control plane network element includes the PCF, the second control network element includes the SMF, and the third control network element includes the AMF.

Figure 18:
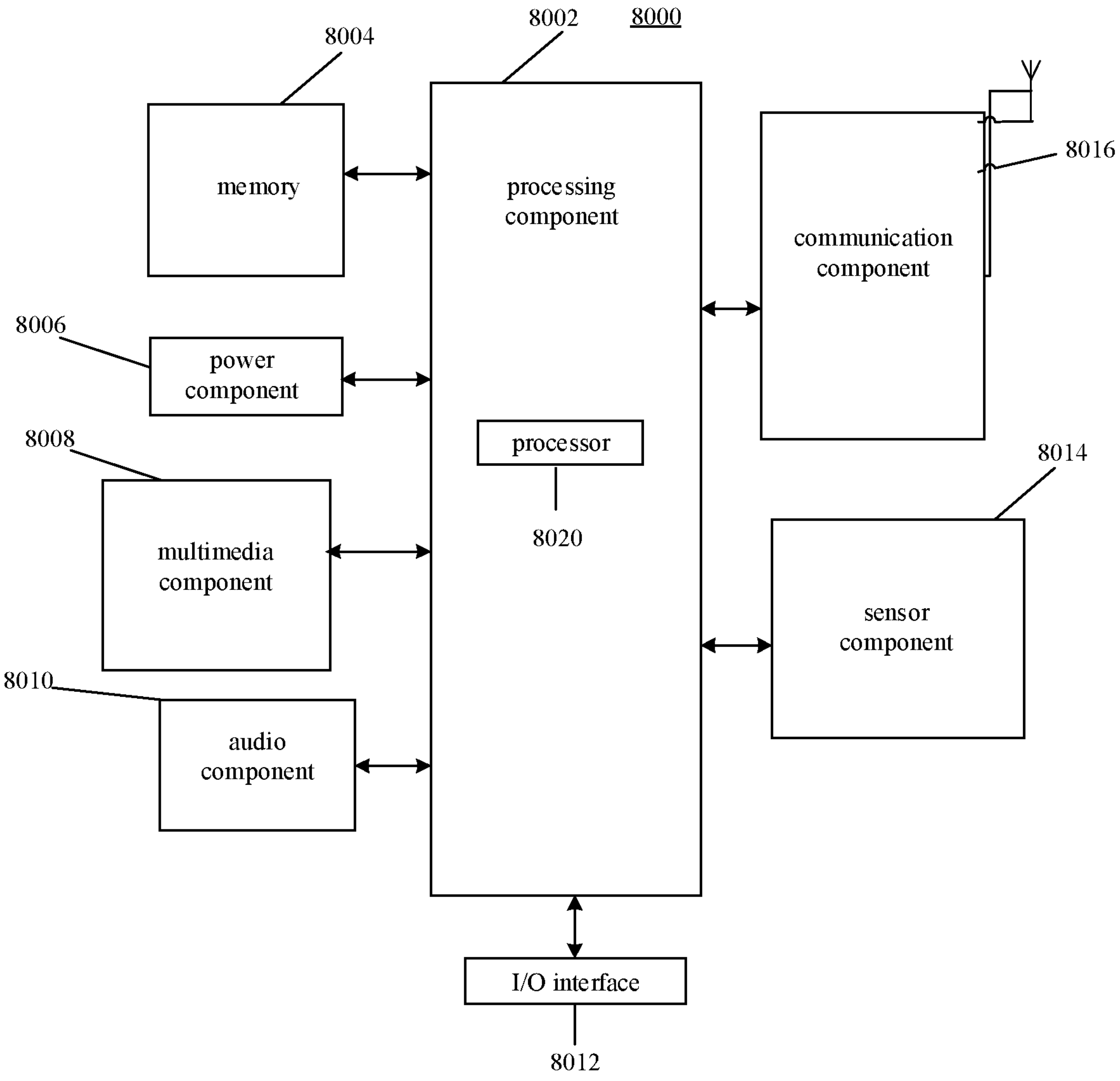
FIG. 18 is a schematic diagram showing composition and structure of a user equipment according to an embodiment.

FIG. 18 is a block diagram illustrating a user equipment 8000. For example, the UE 8000 can be a mobile phone, a computer, a digital broadcast terminal, a messaging device, a game console, a tablet device, a medical device, a fitness device, a personal digital assistant, or the like.

Referring to FIG. 18, the UE 8000 may include one or more of the following components: a processing component 8002, a memory 8004, a power component 8006, a multimedia component 8008, an audio component 8010, an input/output (I/O) interface 8012, a sensor component 8014, and a communication component 8016.

The processing component 8002 typically controls overall operations of the UE 8000, such as the operations associated with display, telephone calls, data communications, camera operations, and recording operations. The processing component 8002 may include one or more processors 8020 to execute instructions to perform all or part of the steps in the above described methods. Moreover, the processing component 8002 may include one or more modules which facilitate the interaction between the processing component 8002 and other components. For instance, the processing component 8002 may include a multimedia module to facilitate the interaction between the multimedia component 8008 and the processing component 8002.

The memory 8004 is configured to store various types of data to support the operation of the UE 8000. Examples of such data include instructions for any applications or methods operated on the UE 8000, contact data, phonebook data, messages, pictures, video, etc. The memory 8004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 8006 provides power to various components of the ULE 8000. The power component 8006 may include a power management system, one or more power sources, and any other components associated with the generation, management, and distribution of power in the UE 8000.

The multimedia component 8008 includes a screen providing an output interface between the UE 8000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 8008 includes a front camera and/or a rear camera. The front camera and/or the rear camera may receive an external multimedia datum while the UE 8000 is in an operation mode, such as a photographing mode or a video mode. Each of the front camera and the rear camera may be a fixed optical lens system or have focus and optical zoom capability.

The audio component 8010 is configured to output and/or input audio signals. For example, the audio component 8010 includes a microphone (MIC) configured to receive an external audio signal when the UE 8000 is in an operation mode, such as a call mode, a recording mode, and a voice recognition mode. The received audio signal may be further stored in the memory 8004 or transmitted via the communication component 8016. In some embodiments, the audio component 8010 further includes a speaker to output audio signals.

The I/O interface 8012 provides an interface between the processing component 8002 and peripheral interface modules, such as a keyboard, a click wheel, a button, and the like. The button may include, but are not limited to, a home button, a volume button, a starting button, and a locking button.

The sensor component 8014 includes one or more sensors to provide status assessments of various aspects of the UE 8000. For instance, the sensor component 8014 may detect an open/closed status of the UE 8000, relative positioning of components, e.g., the display and the keypad, of the UE 8000, a change in position of the UE 8000 or a component of the UE 8000, a presence or absence of user contact with the UE 8000, an orientation or an acceleration/deceleration of the UE 8000, and a change in temperature of the ULE 8000. The sensor component 8014 may include a proximity sensor configured to detect the presence of nearby objects without any physical contact. The sensor component 8014 may include a light sensor, such as a CMOS or CCD image sensor, for use in imaging applications. In some embodiments, the sensor component 8014 may include an accelerometer sensor, a gyroscope sensor, a magnetic sensor, a pressure sensor, or a temperature sensor.

The communication component 8016 is configured to facilitate communication, wired or wirelessly, between the UE 8000 and other devices. The UE 8000 can access a wireless network according to a communication standard, such as WiFi, 2G, or 3G, or a combination thereof. In one embodiment, the communication component 8016 receives a broadcast signal or broadcast associated information from an external broadcast management system via a broadcast channel. In one embodiment, the communication component 8016 further includes a near field communication (NFC) module to facilitate short-range communications. For example, the NFC module may be implemented according to a radio frequency identifier (RFID) technology, an infrared data association (IrDA) technology, an ultra-wideband (UWB) technology, a Bluetooth (BT) technology, and other technologies.

In embodiments, the UE 8000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In embodiments, there is further provided a non-transitory computer-readable storage medium (such as the memory 8004) including instructions that, when executed by the processor 8020 of the UE 8000, to perform any of the above-described methods. For example, the non-transitory computer-readable storage medium may be a ROM, a RAM, a CD-ROM, a magnetic tape, a floppy disc, an optical data storage device, and the like.

Embodiments of the present disclosure further provide a non-transitory computer-readable storage medium having stored therein an executable program that, when executed by a processor, causes steps of the communication method according to any one of the above embodiments to be implemented.

The communication method, apparatus and system, the network equipment and the storage medium of the embodiments of the present disclosure can determine, according to a transmission rate of a current network slice, a slice bandwidth control by using the utilized data rate as the input, which is initiated by the PCF or other network elements, and control the slice bandwidth precisely. With the embodiments of the present disclosure, a better access experience for the slice network is provided.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and examples be considered as explanatory only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A communication method, comprising:

in response to being triggered by a policy decision, performing, by a first control plane network element, a session management (SM) policy association modification procedure initiated by the first control plane network element, to notify a second control plane network element of a modification of a policy; and in response to determining that a remaining data rate for single network slice selection assistance information (S-NSSAI) reaches a threshold, using, by the first control plane network element, a utilized data rate of the S-NSSAI for the policy decision, and downgrading, by the first control plane network element, an authorized session aggregate maximum bit rate (Session-AMBR), wherein the remaining data rate is obtained by deducting the authorized Session-AMBR from a Maximum Bit Rate (MBR) allocated to the S-NSSAI; and the utilized data rate of the S-NSSAI is determined according to analytics information provided by a network data analysis function (NWDAF) network element.

2. The method according to claim 1, further comprising:

using, by the first control plane network element, a ratio of the utilized data rate to an accumulated data rate and a maximum bit rate (MBR) per service data flow (SDF) for the policy decision of the first control plane network element;

using, by the first control plane network element, a subscriber category for the policy decision of the first control plane network element;

using, by the first control plane network element, an application-based preference for the policy decision of the first control plane network element;

using, by the first control plane network element, a subscriber category and an application-based preference for the policy decision of the first control plane network element; or using, by the first control plane network element, analytics information provided by the NWDAF network element for the policy decision of the first control plane network element.

3. The method according to claim 1, wherein downgrading, by the first control plane network element, the authorized Session-AMBR comprises:

sending, by the first control plane network element, a first indication message to the second control plane network element, wherein the first indication message indicates an SM policy association modification for downgrading the authorized Session-AMBR.

4. The method according to claim 3, wherein the first indication message comprises at least one of: an S-NSSAI identifier and the authorized Session-AMBR.

5. A communication method, performed by the second control plane network element according to claim 1, the communication method comprising:

receiving a first indication message from the first control plane network element, the first indication message indicating that the remaining data rate for the S-NSSAI reaches the threshold; and changing the authorized Session-AMBR in response to the first indication message.

6. The method according to claim 5, wherein the first indication message comprises at least one of: an S-NSSAI identifier and the authorized Session-AMBR;

wherein the method further comprises:

initiating, by the second control plane network element, a packet data unit (PDU) session modification procedure to change the authorized Session-AMBR.

7. A communication method, performed by the second control plane network element according to claim 1, the communication method comprising:

receiving a first indication message from the first control plane network element, the first indication message indicating that the remaining data rate for the S-NSSAI reaches the threshold; and changing a maximum bit rate (MBR) and a guaranteed bit rate (GBR) corresponding to a service data flow (SDF) in response to the first indication message.

8. The method according to claim 7, wherein the first indication message comprises at least one of: an S-NSSAI identifier, and the MBR and the GBR corresponding to the SDF;

wherein the method further comprises:

performing, by the second control plane network element, an authorized quality of service (QoS) of the service data flow according to a policy and charging control (PCC) rule.

9. A first network device, comprising a processor, a transceiver, a memory, and a processor-executable program stored in the memory that, when executed by the processor, causes steps of the communication method according to claim 1 to be implemented.

10. The method according to claim 1, wherein the first control plane network element comprises a policy control function (PCF) network element, and the being triggered by a policy decision comprises:

being triggered by an internal PCF event or triggered by application function (AF) network element, a unified data repository (UDR) network element, or the network data analysis function (NWDAF) network element.

11. A communication method, comprising:

in response to being triggered by a policy decision, performing, by a first control plane network element, a session management (SM) policy association modification procedure initiated by the first control plane network element, to notify a second control plane network element of a modification of a policy; and in response to determining that a remaining data rate for single network slice selection assistance information (S-NSSAI) reaches a threshold, updating, by the first control plane network element, a policy and charging control (PCC) rule, and using, by the first control plane network element, a utilized data rate of the S-NSSAI for the policy decision of the first control plane network element, wherein the remaining data rate is obtained by deducting an authorized session aggregate maximum bit rate (Session-AMBR) from a Maximum Bit Rate (MBR) allocated to the S-NSSAI; and the utilized data rate of the S-NSSAI is determined according to analytics information provided by a network data analysis function (NWDAF) network element.

12. The method according to claim 11, further comprising:

using, by the first control plane network element, a ratio of the utilized data rate to an accumulated data rate and a maximum bit rate (MBR) per service data flow (SDF) for the policy decision of the first control plane network element;

using, by the first control plane network element, a subscriber category for the policy decision of the first control plane network element;

using, by the first control plane network element, an application-based preference for the policy decision of the first control plane network element;

using, by the first control plane network element, a subscriber category and an application-based preference for the policy decision of the first control plane network element; or using, by the first control plane network element, analytics information provided by the NWDAF network element for the policy decision of the first control plane network element.

13. The method according to claim 11, wherein notifying the second control plane network element of the modification of the policy comprises:

sending, by the first control plane network element, a first indication message to the second control plane network element, wherein the first indication message indicates decreasing an MBR of a related quality of service (QoS) flow.

14. The method according to claim 13, wherein the first indication message comprises at least one of: an S-NSSAI identifier, and an MBR and a guaranteed bit rate (GBR) corresponding to an SDF.

15. A communication method, comprising:

in response to being triggered by a policy decision, performing, by a first control plane network element, an access and mobility management (AM) policy association modification procedure initiated by the first control plane network element, to notify a third control plane network element of a modification of a policy; and in response to determining that a remaining data rate for single network slice selection assistance information (S-NSSAI) reaches a threshold, downgrading, by the first control plane network element, an authorized a-user equipment-slice-aggregate maximum bit rate (UE-Slice-AMBR), and using, by the first control plane network element, a utilized data rate of the S-NSSAI for the policy decision of the first control plane network element, wherein the remaining data rate is obtained by deducting the authorized Session-AMBR from a Maximum Bit Rate (MBR) allocated to the S-NSSAI; and the utilized data rate of the S-NSSAI is determined according to analytics information provided by a network data analysis function (NWDAF) network element.

16. The method according to claim 15, further comprising:

using, by the first control plane network element, a ratio of the utilized data rate to an accumulated data rate and a maximum bit rate (MBR) per service data flow (SDF) for the policy decision of the first control plane network element;

using, by the first control plane network element, a subscriber category for the policy decision of the first control plane network element;

using, by the first control plane network element, an application-based preference for the policy decision of the first control plane network element;

using, by the first control plane network element, a subscriber category and an application-based preference for the policy decision of the first control plane network element; or using, by the first control plane network element, analytics information provided by the NWDAF network element for the policy decision of the first control plane network element.

17. The method according to claim 15, wherein downgrading, by the first control plane network element, the authorized UE-Slice-AMBR comprises:

sending, by the first control plane network element, a second indication message to the third control plane network element, wherein the second indication message indicates an AM policy association modification for downgrading the authorized UE-Slice-AMBR.

18. The method according to claim 17, wherein the second indication message comprises at least one of: an S-NSSAI identifier and the authorized UE-Slice-AMBR.

19. A communication method, performed by the third control plane network element according to claim 15, the communication method comprising:

receiving a second indication message from the first control plane network element, the second indication message indicating that the remaining data rate for the S-NSSAI reaches the threshold; and changing the authorized UE-Slice-AMBR in response to the second indication message.

20. The method according to claim 19, wherein the second indication message comprises at least one of: an S-NSSAI identifier and the authorized UE-Slice-AMBR;

wherein the method further comprises:

initiating, by the third control plane network element, a packet data unit (PDU) session modification procedure to change the authorized UE-Slice-AMBR.

* * * * *